United States Patent

Sasabe et al.

[15] 3,657,471

[45] Apr. 18, 1972

[54] MULTIPLE OPTICAL SYSTEM FOR COLOR FACSIMILE SYSTEM

[72] Inventors: Kaoru Sasabe, Ikeda-shi; Yoshihiro Okino, Kyoto, both of Japan

[73] Assignee: Matsushita Electric Industrial Co. Ltd., Osaka, Japan

[22] Filed: Sept. 30, 1968

[21] Appl. No.: 763,516

[30] Foreign Application Priority Data

Oct. 4, 1967 Japan..................................42/63973

[52] U.S. Cl. ........................178/5.4 CD, 346/109, 178/6.7 A

[51] Int. Cl. ......................H04n 5/86, H04n 9/14, G11b 7/00

[58] Field of Search......................178/5.2 A, 5.4 ES, 5.4, 5.2, 178/5.4 BD, 6.7 A, 7.4, 7.6; 346/108, 109, 134; 250/230; 350/6, 285

[56] References Cited

UNITED STATES PATENTS

| | | | |
|---|---|---|---|
| 2,615,975 | 10/1952 | Sziklai | 178/5.4 |
| 2,965,703 | 12/1960 | Loughlin | 178/5.2 |
| 3,154,371 | 10/1964 | Johnson | 346/108 |
| 3,349,174 | 10/1967 | Warschauer | 178/7.6 |
| 3,383,460 | 5/1968 | Pritchard | 178/5.4 |
| 2,474,303 | 6/1949 | Davis | 346/109 |
| 2,692,370 | 10/1954 | Moore | 346/109 |
| 3,142,528 | 7/1964 | Stafford et al. | 346/109 |
| 3,329,824 | 7/1967 | Joy | 250/230 |
| 3,331,299 | 7/1967 | Morgan | 346/109 |
| 3,303,276 | 2/1967 | Haeff | 178/5.4 |

*Primary Examiner*—Robert L. Richardson
*Assistant Examiner*—John C. Martin
*Attorney*—Stevens, Davis, Miller & Mosher

[57] ABSTRACT

A color facsimile system wherein light beams from three xenon discharge lamps whose intensity of light is modulated by an electric signal corresponding to each component color information transmitted from the sending end are synthesized through respective color filters and said synthesized light beam is focused on a flat photo-sensitive film, the focused bright spot being moved in scanning by means of a vibrating mirror which is electronically driven, thus reproducing the original picture on said flat film.

7 Claims, 10 Drawing Figures

Patented April 18, 1972 3,657,471

6 Sheets-Sheet 1

MULTIPLE OPTICAL SYSTEM FOR COLOR FACSIMILE SYSTEM

This invention relates to a receiving device in a color facsimile system with which a color picture is transferred to a remote place by means of an electric signal.

In the conventional color facsimile systems, color reproduction at the receiving end is obtained from negative black-and-white films assigned to respective component colors which are transmitted in the field-sequential manner from the sending end through a conventional black-and-white facsimile system. Therefore, it is usually very difficult for the component negatives to be registered point to point because of noise or distortion in the transmitted signal, and the exact correspondence of fields initially adjusted deviates gradually. Even if the component negatives are registered exactly, hue and tint will change with the variation of attenuation of the signal in the transmission line. Moreover, in the conventional color facsimile systems, a color printer is necessary for reproducing a color picture from the component negative black-and-white films.

The above mentioned problem has been solved by this invention.

An object of the invention is to provide a color facsimile system characterized in that light beams from three electric discharge lamps whose output lights are modulated respectively by electric signals transmitted from the sending end and originating from three component pictures of respective component colors are synthesized into a single light beam after being passed through optical filters of respective colors, and said synthesized light beam is focused on a photo-sensitive sheet through an optical system, said focused point being moved in scanning on said sheet by a scanning mirror driven in synchronization with the scanning of the original picture at the sending end.

Another object of this invention is to provide a color facsimile system in which a transferred picture can be reproduced in a desired size.

A further object of this invention is to provide a color facsimile system in which the size of the reproduced picture can be changed selectively by a simple operation.

A still further object of this invention is to provide a color facsimile system in which the recording medium is pushed into a light-intercepting envelope as the reproduction proceeds on the recording medium.

Other objects and features of this invention will be made clear in the following explanation given in connection with embodiments of this invention and by referring to the attached drawings in which.

Figures 1, 6:
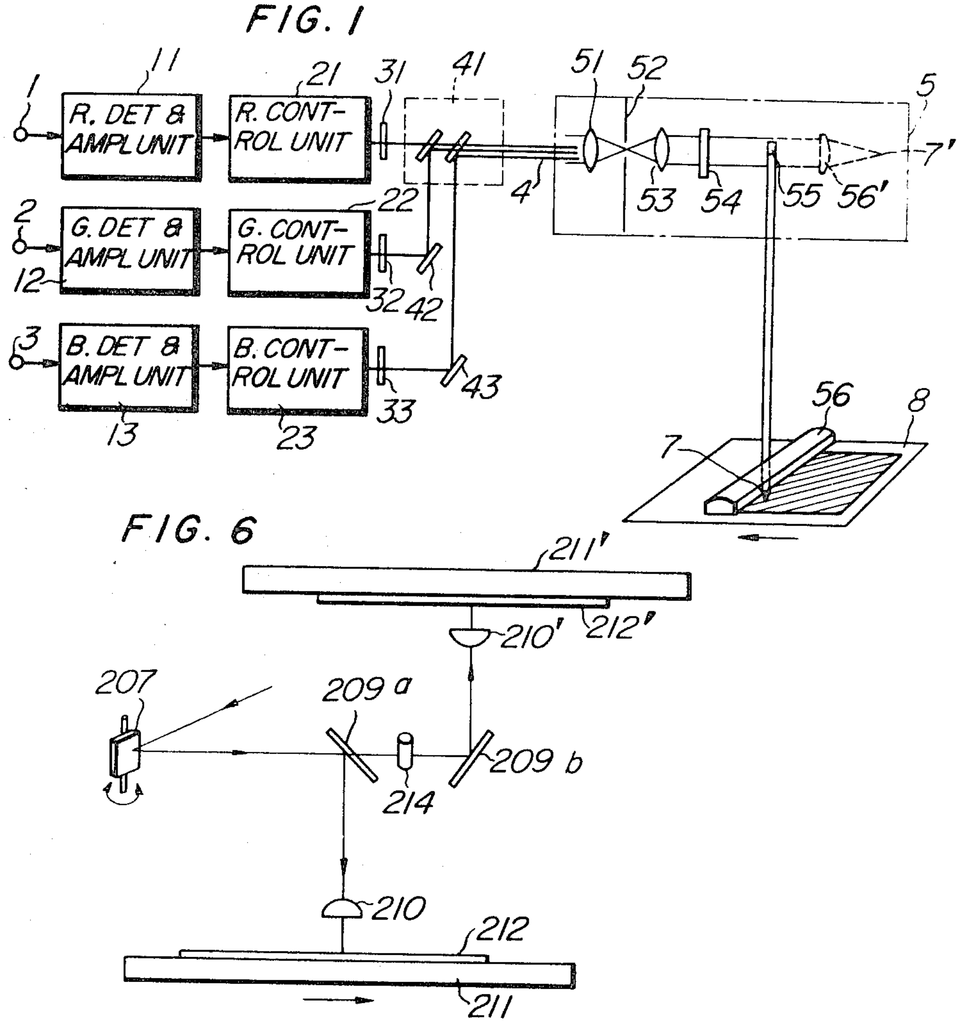
FIG. 1 is a block diagram showing the constitution of a color facsimile system embodying this invention.
FIGS. 4, 5 and 6 are schematic isometric views of the embodiment in which a plurality of reproduced pictures are obtained in the same or different sizes.

Referring to FIG. 1, terminals 1, 2 and 3 receive color signals of respective component colors of red, green and blue (hereafter, abbreviated as R, G and B respectively) originating from a particular point in the color picture at the sending end. The received signals are applied to respective detecting and amplifying units 11, 12 and 13. The outputs from said detecting and amplifying units 11, 12 and 13 are fed respectively to light control units 21, 22 and 23 each including a xenon discharge lamp whose output light is controlled by the color signal output from the associated detecting and amplifying unit, and the intensity of the output lights from the xenon lamps are modified by said respective color signals. Then, said output lights from the respective xenon lamps are colored in R, G and B through R, G and B filters 31, 32 and 33 respectively.

It will be noted that a xenon discharge lamp has a high brightness and a flat spectrum distribution. Therefore, said respective filtered lights sensitize a photo-sensitive film 8 with good color rendering.

Now, R light from the unit 21, G light from the unit 22 and B light from the unit 23 are synthesized through a half-mirror system 41 to become a single light 4 after G and B are reflected by reflectors 42 and 43 respectively. The synthesized light 4 is focused on the sensitive film 8 at a point 7 through a focusing system 5 and a vibrating mirror 55 positioned within said focusing system 5 which contains two lens systems acting in the directions of the co-ordinate axes X and Y respectively.

Reproduction of the original color picture is achieved by making said vibrating mirror 55 to vibrate in synchronization with the scanning period at the transmitter, thereby moving said focused point 7 correspondingly on the film 8.

Figure 2:
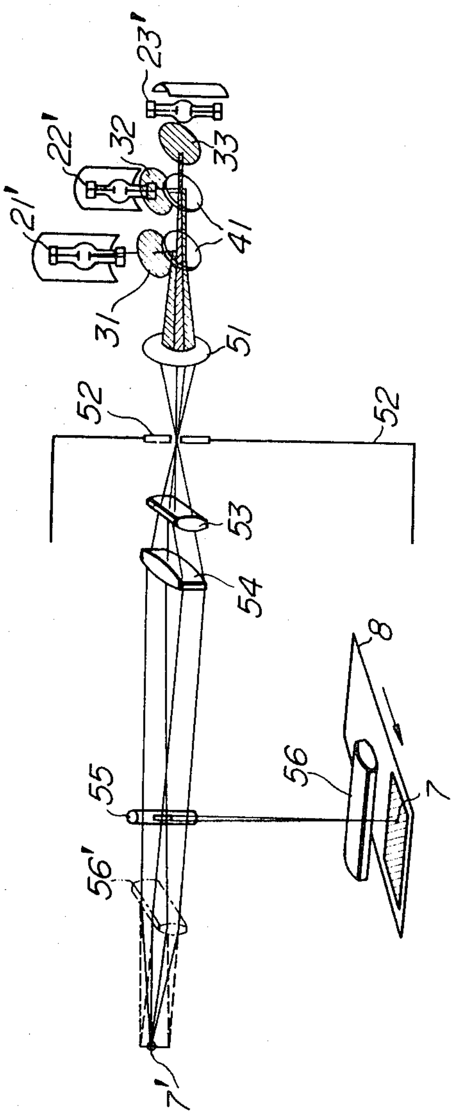
FIG. 2 is a schematic isometric view of the main portion of the system shown in FIG. 1.

Now, the optical system will be explained more in detail referring to FIG. 2. The lights from the xenon lamps 21', 22' and 23' respectively modulated by R, G and B signals are led to a condenser lens 51 through the above-mentioned optical filters 31, 32 and 33 and further the half-mirror 41, thus the lights being combined and converged. The ensuing optical system is masked from the light source system by means of a light-intercepting cover 52 provided in the vicinity of the point of convergence of the synthesized light.

Lens 53 has a curvature about the vertical axis (Y axis) but nor curvature about the horizontal axis (X axis); while lens 54 has a curvature about its X axis but not about its Y axis. The vibrating mirror 55 reflects the light towards an objective lens 56 which converges the light only in the direction of the Y axis so that the light is focused on the recording film 8 at the point 7. Reference numerals 56' and 7' indicate an imaginary position of the lens 56 and a virtual image of the focal point 7.

As described above, according to this invention, the output light from three xenon discharge lamps which are modulated by signals originating respectively from the original R, G and B pictures at the sending end, are combined into a single light after they are passed through the R, G and B filters respectively, the thus synthesized light being focused on the recording film through an optical system consisting of two optical elements having separate focusing systems in mutually orthogonal directions, and the spot of the focused light on the recording film being moved in the scanning by the vibrating mirror which oscillates in synchronization with the scanning period of the transmitter at the sending end. Thus, in the color facsimile system of this invention in which three chrominance lights are deflected by a single vibrating mirror at the same time, the vibrating mirror system is simplified in construction, and the conventional rotating drum for effecting the main scanning and the associated driving mechanisms are all eliminated.

Further, the use of xenon lamps which are appropriate in brightness as well as in correlated color temperature (and therefore, the spectrum distribution) and which can be modulated in intensity of light, makes it possible to sensitize a color film of ASA 10 with a light reflected from the vibrating mirror as small as about 1 $mm^2$ in effective reflective area.

Moreover, as it is possible to design that said light spot sweeps almost flatly along the surface of the recording film, it is not necessary for the film to be curbed in the direction of the sweep. Therefore, a flat film as well as a roll film can be used in such a manner that said film is continuously fed to the recording position from an envelope as the recording proceeds.

In another embodiment of this invention, the size of the reproduced picture can be selected as desired. In a conventional facsimile system, the enlargement or the reduction of the reproduced picture in relation to the original picture is predetermined in a fixed ratio and is unchangeable. That is, in the commonly used facsimile receivers in which a recording film placed around a rotating drum is scanned with a light spot controlled by the received facsimile signal, the enlargement or the reduction of the picture has never been attempted on any practical level, as it is inevitable that such a requirement involves a very complicated mechanism.

Figure 3:
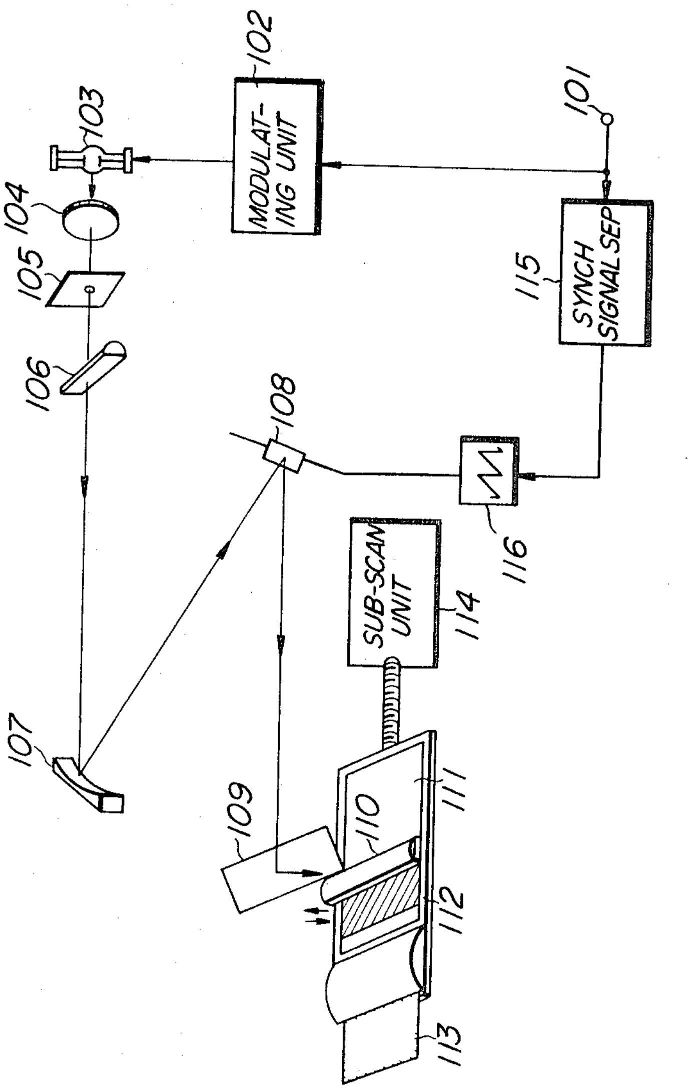
FIG. 3 is a schematic diagram showing another embodiment of this invention.

According to this invention, the enlargement or the reduction of the picture can be easily attained in a manner as described hereunder with reference to FIG. 3. Though the following description is made relating to a mono-chromatic facsimile system just for simplicity, it will be clear that the same principle is applied to the color facsimile system described in connection to FIGS. 1 and 2.

A facsimile signal received at a receiving terminal 101 is led to a modulating unit 102 to modulate the luminous intensity of a light source 103, which radiates a light with an intensity proportional to the amplitude of said image signal. A xenon discharge lamp or another highly radiant discharge lamp is used as the light source 103. The light from the source 103 is focused on the recording film 111 through a lens 104, pinhole 105 and cylindrical lens 106 and is reflected by a concave mirror 107, vibrating mirror 108 and reflecting mirror 109, and then through a second cylindrical lens 110. The bright spot focused on the recording film 111 scans the film according to the vibration of the vibrating mirror 108, thus effecting the main scanning. It will be needless to say that the main scanning by the vibrating mirror 108 must be synchronized with the scanning in the reading operation at the sending end. Therefore, the vibrating mirror 108 is driven by a saw-tooth current generated in a saw-tooth wave generator 116 in synchronization with the synchronizing pulse separated from the received signal through the synchronization signal separator 115. Thus, the picture put on the transmitter is reproduced on the recording film 111. In the figure, reference numeral 112 indicates a film pack containing the film 111, numeral 113 a light-intercepting envelope, and 114 a driving unit for the sub-scanning which moves the film pack 112 at a rate corresponding to that of the sub-scanning at the sending end. Relating to the optical system, the focusing in the lengthwise direction is effected by the lenses 104, 106 and 110, while the focusing in the lateral direction is by the lens 104 and the concave mirror 107. Therefore, the focusing in said two directions can be controlled independently. This arrangement is advantageous for the adjustment of the shape of the bright spot as will become clear in the subsequent descriptions.

The deflecting angle of the vibrating mirror 108 is adjusted by controlling the driving current of said mirror 108 in the saw-tooth wave generator 116. A corresponding adjustment is made to the sub-scanning rate through the subscanning unit 114 in such a manner that the factor of coefficient is constant. Further, the cylindrical lens 110 is raised or lowered as required to adjust the size and shape of the bright spot.

If the enlargement or the reduction of the reproduced picture is effected only by adjusting the deflecting angle of the vibrating mirror and the rate of subscanning, the resultant reproduced picture will not be perpendicular a reduced satisfactory, appearing very unnatural, because the size and shape of the elementary dots constituting the picture are not adapted to the changed space of the picture. In the present embodiment, however, the length of the bright spot in the direction perpendicular to the line of the main scanning (which is important for a good resolution) can be easily changed by adjusting the vertical position of the cylindrical lens 110 manually or in connection to the operation of the sub-scanning driving unit 114, said length of the spot being expanded for an enlarged picture but compressed for a reduced picture, and the number of elementary dots contained in the picture being kept substantially constant. Therefore, the reproduced picture looks natural and can be projected on a large screen with a satisfactory resolution if desired. The size or shape of the bright spot is not necessarily required to be continuously changeable but may be changed in steps among several predetermined size with a simple mechanism.

As described above, according to this invention, the size of the reproduced picture can be enlarged or reduced as desired, and further, size and shape of the elementary dots constituting the picture can be varied to obtain an appropriately natural-looking picture.

In the next embodiment, the size of the picture to be reproduced can be switched between two predetermined sizes with simple arrangement and easy operation.

Figure 4:
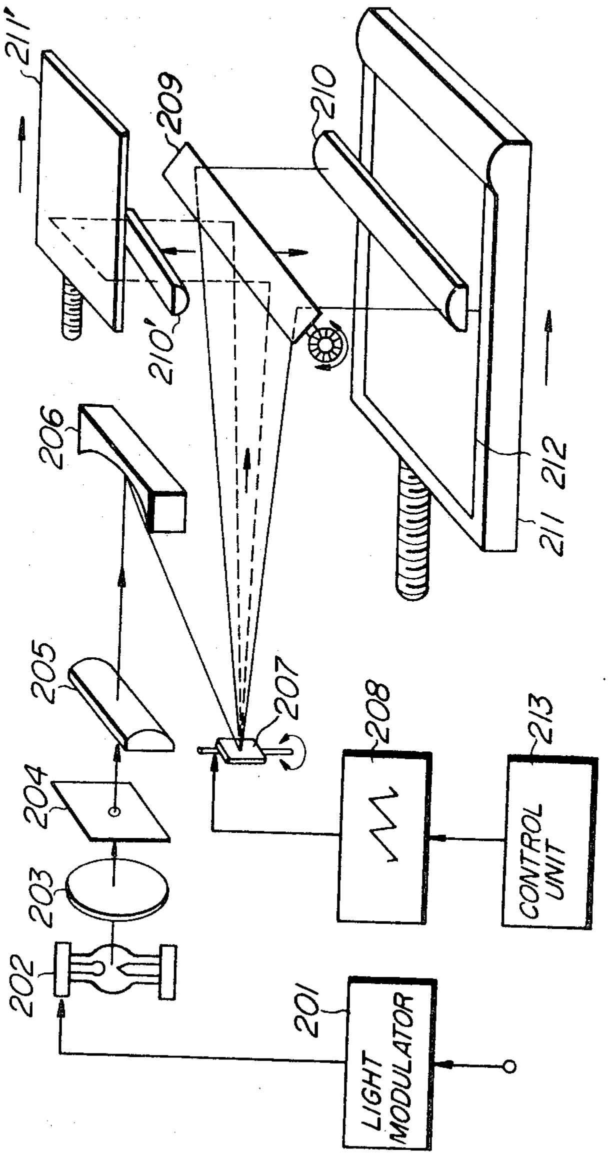

Referring to FIG. 4, reference numeral 201 indicates a light modulator for modulating the intensity of the light from a light source 202 according to the electric signal transmitted from the sending end, 203 a convex lens for focusing said light from said source 202 on a plate 204 having a pinhole, 205 a cylindrical lens which is effective only in the lengthwise direction (i.e., the direction of the sub-scanning) and parallel in the lateral direction (i.e., the direction of the main scanning), 206 a concave mirror which is effective only in the lateral direction and converges the incident light in the effective direction, 207 a vibrating mirror which is electromagnetically driven to effect the main scanning, 208 a saw-tooth wave generator for driving said vibrating mirror 208, and numeral 209 indicates a mirror for switching the light beams which reflects the light beam, for instance, downwards as shown in the figure but is switched so as to reflect the light beam upwards when necessary.

Further, reference numerals 210 and 210′ indicate cylindrical lenses which are effective only in the above-defined lengthwise direction and which converge the light beams on recording films 212 and 212′ placed on film holders 211 and 211′ respectively. Said film holders 211 and 211′ are moved respectively at predetermined rates in the directions shown by arrows in the figure thereby to effect the sub-scanning. Control unit 213 controls the amplitude of the saw-tooth wave generated in the saw-tooth wave generator 208 in accordance with the selected size of the reproduction and thereby controls the deflecting angle of the vibrating mirror 207 which determines the length of the main scanning.

Operation of this embodiment is as follows: The modulated light from the light source 202 is focused on the recording film 212 (or alternatively 212′ ) after being converged in the lengthwise direction through the lenses 205 and 210 (or 210′ ) and in the lateral direction by the concave mirror 206, and scans the recording film 212 (or 212′ ) in the lateral direction with the movement of the vibrating mirror 207. The deflecting angle of the vibrating mirror 207 which is determined through the control unit 213, is selected with a fixed relation to the sub-scanning rate with which the film holder 211 (or 211′ ) is moved. Thus, according to this invention and particularly to this embodiment of the reproduction can be selected easily from two predetermined sizes by simply switching the reflecting direction of the mirror 209 with connection to switching of the control unit 213 which controls the deflecting angle of the vibrating mirror 207.

Figure 5:
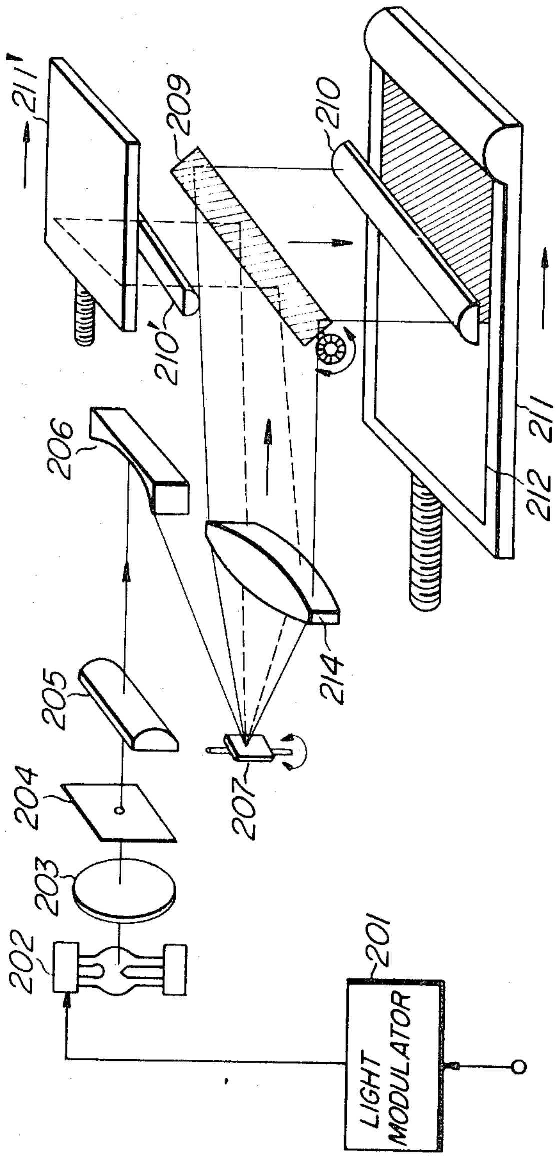

In the above-described embodiment, the length of the main scanning has been changed by controlling the amplitude of the saw-tooth wave which drives the vibrating mirror 207. In the following embodiment, said length of the main scanning, i.e., the width of the picture to be reproduced is controlled through an optical means. Referring to FIG. 5, the deflecting angle of the vibrating mirror 207 can virtually be varied by providing between the vibrating mirror 207 and the switching mirror 209 a cylindrical lens 214 which is effective only in the lateral direction. In this arrangement, the switching of the mirror 209 is interlocked with insertion of the lens 14 or selection between two such lenses of different focal length.

Further, in an alternative arrangement, the vibrating mirror can be replaced by a rotating mirror.

Moreover, it is possible by using an appropriate optical arrangement to obtain simultaneously on two or more recording films two or more reproductions either of the same size or of different sizes. FIG. 6 shows an example of such an optical arrangement. In FIG. 6, reference numeral 209*a* indicates a half-mirror, and 209*b* a full reflecting mirror. The light beam is divided into two by the half-mirror 209*a* thereby to make two reproductions at the same time, one on the film 212 and the other on the film 212'.

Thus, according to this invention, it is possible to enlarge or reduce the size of the reproduced picture with a simple arrangement, and to select easily one of two or more predetermined sizes for the reproduction, and further to make at the same time two or more reproductions of the same size or of different sizes.

It should be noted that the embodiments described heretofore can be applied also to a facsimile transmitter or a similar device with a few modifications. The conversion to a transmitter will be achieved by replacing the recording film by an original picture appropriately illuminated and the light source by a photoelectric transducer such as a photoelectric multiplier.

Figure 10:
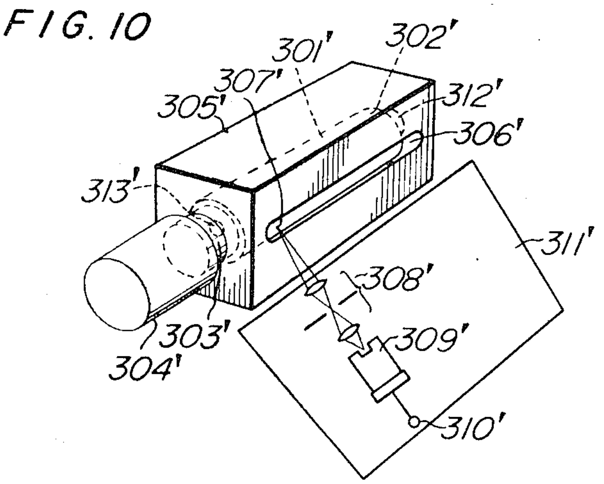
FIG. 10 is a schematic isometric view of a portion of a conventional facsimile device.

In the next embodiment of this invention, an arrangement with which the photo-sensitive recording medium can be handled effectively and easily is shown. In a facsimile receiver in which a photo-sensitive recording medium is used, the recording medium must not be exposed to light other than the recording light beam. For the purpose of such an interception of light, a device as shown in FIG. 10 is used with a conventional facsimile receiver. That is, a drum 302' wrapped with the recording film 301' is rotatably supported by bearings 312' and 313' provided within a dark box 305'. Such a loaded dark box, with the slit 306' closed, is brought out from a darkroom to be coupled to the facsimile receiver which is located usually in a light room, and the drum 302' is connected with a driving motor 304' by means of a clutch 303'. While the drum 302' is being rotated, the slit 306' is opened to introduce the light beam from the light source 309', which is modulated with the facsimile signal received at the terminal 310' and focused, through an optical system 308', on the film 301' making a bright spot 307' which is moved by an appropriate sub-scanning mechanism 311' in synchronization with the sub-scanning rate at the sending end. Upon completion of a reproduction, the dark box 305' containing the drum 302' and the film 301' is disengaged from the driving motor 304' and taken to the darkroom where the film is developed and fixed. As is seen from the above description, the operation of the conventional system is very troublesome as loading and unloading of the film must be done in a darkroon.

Figure 7:
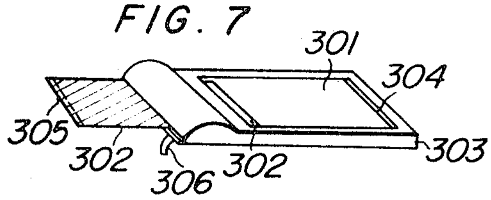
FIGS. 7 and 8 are isometric views of a film pack assembly and a light-intercepting envelope which are used in connection with an embodiment of this invention.
Figure 8:
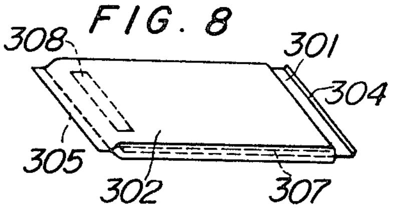
Figure 9:
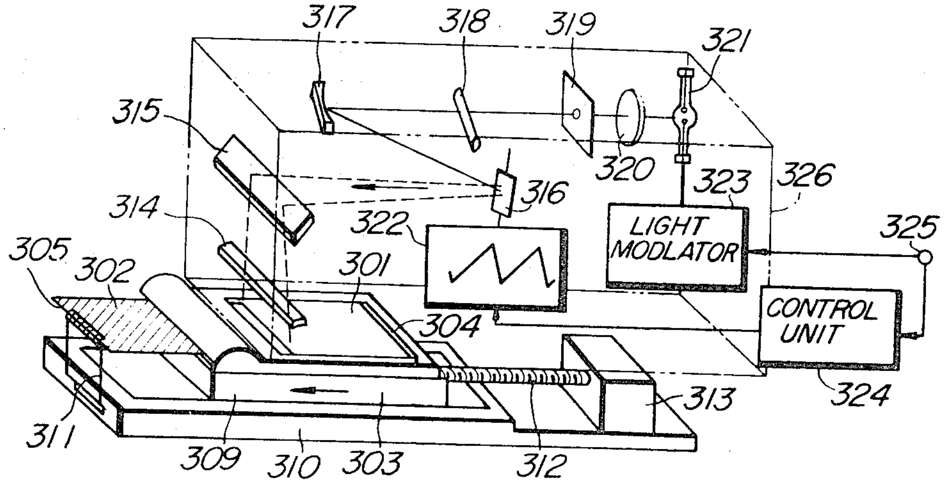
FIG. 9 is an isometric view of an embodiment of this invention in which the film is put into the envelope as the recording proceeds on the film.

According to this invention, such a troublesome operation is eliminated as will be described hereunder in connection to an embodiment of the invention. Referring to FIGS. 7, 8 and 9, reference numeral 301 indicates a recording film, 302 a stiff light-intercepting envelope for receiving the film, 303 a holder for receiving said envelope, 304 an elongated clip for retaining the film 301 at the end of said holder so that the envelope 302 can be removed leaving the film in the holder, by pulling the end portion 305 of said envelope, 306 a lever for controlling the operation of the clip 304, numeral 307 a stencil paper used for diffusion transcription, and 308 a pad containing developing solution. The stencil paper 307 and the developing solution 308 are not provided in the use with ordinary printing paper. In FIG. 9, reference numeral 309 indicates a sliding base for moving the film holder 303 in the sub-scanning, 310 a stationary chassis carrying the sliding base 309, and 311 a stopper for preventing the drawn-out envelope 302 from moving along with the sliding base 309 during the recording, thereby causing the recording film to be inserted into the envelope 302 as the sub-scanning proceeds. The stopper 311 is lowered when the receiver is not operating. Numeral 312 indicates a threaded shaft driven by the driving unit 313 for moving the sliding base 309 in the sub-scanning.

For the operation, the film holder 303 mounted on the sliding base 309 is first positioned at the end of the rail nearest to the driving unit 313. Then, the envelope 302 is drawn out, the film 301 being retained in the holder 303 by the clip 304, and the stopper 311 is erected to prevent movement of the envelope 302 in the sub-scanning. Thus, the already recorded portion of the film is inserted into the envelope as the recording proceeds. The facsimile signal received at the terminal 325 is separated into an information signal and a synchronization signal in the synchronization signal separator 324, and the former signal is fed to the light modulator 323 to modulate the output light of the lamp 321, while the latter signal is supplied to the saw-tooth wave generator 322 to drive the vibrating mirror 316. Lenses 314, 318 and 320, mirrors 315 and 317 and pinhole plate 319 constitute an optical system for focusing the modulated light beam from the source 321 on the film 301. The whole of the optical system including the film 301 is covered with a light-intercepting cover 326.

As described above, according to this invention the troublesome operation of loading the film to the drum in a darkroom is eliminated, since the recorded portion of the film moves on into the envelope, and the film contained in the flat envelope before and after the recording can easily be handled under the light.

What we claim is:

1. A color facsimile receiver comprising a plurality of electric discharge lamps, a plurality of control means respectively associated with said discharge lamps for modulating output lights of said discharge lamps according to respective electric signals transmitted from a sending station, said electric signals respectively representing the intensity of three color components of a scanned original picture, a plurality of color filters respectively placed in the paths of beams emitted from said discharge lamps, a first optical system for combining light beams from said filters into a single light beam, a second optical system for focusing the combined single light beam on at least one photo-sensitive sheet, a movable mirror provided on the path of said combined single light beam, and means moving the focused spot of said combined single light beam for horizontal scanning including means for driving said movable mirror in synchronization with the scanning of the original picture at the sending station, wherein said means for driving said movable mirror is a sawtooth generator, and an optical element for converging said light beam in the horizontal direction is provided between said moving mirror and the photo-sensitive sheet, and further comprising means for controlling the amplitude of saw-tooth current for driving said moving mirror, the scanning rate of the optical element, and the distance between said photo-sensitive sheet and said optical element in relation to each other.

2. A color facsimile receiver as defined in claim 1, wherein said second optical system includes an optical system which has a focusing function at least in the direction of horizontal scanning and which is inserted between said vibrating mirror and at least one of said plurality of photo-sensitive sheets.

3. A color facsimile receiver according to claim 1, further comprising at least one half-silvered mirror for distributing said combined single light beam to a plurality of photo-sensitive sheets.

4. A color facsimile receiver according to claim 1, wherein said second optical system comprises: an optical switch means to direct said single light beam to optically select one of a plurality of photo-sensitive sheets, and means to move said selected photo-sensitive sheet for vertical scanning thereof.

5. A color facsimile receiver as defined in claim 4, which further includes means for selectively varying the amplitude of oscillation of said movable mirror and the rate of said verticle scanning in connection with the selected position of said optical switch means.

6. A color facsimile receiver according to claim 5, further comprising optical means for varying the size of the spot of said combined single light beam in connection with the operation of said optical switch means.

7. A color facsimile receiver comprising a plurality of electric discharge lamps, a plurality of control means respectively associated with said discharge lamps for modulating output lights of said discharge lamps according to respective electric signals transmitted from a sending station, said electric signals respectively representing the intensity of three color components of a scanned original picture, a plurality of color filters respectively placed in the paths of beams emitted from said discharge lamps, a first optical system for combining light beams from said filters into a single light beam, a second optical system for focusing the combined single light beam on at least one photo-sensitive sheet, a movable mirror provided on the path of said combined single light beam, and means moving the focused spot of said combined single light beam for scanning including means for driving said movable mirror in synchronization with the scanning of the original picture at the sending station, and further comprising a holder for supporting said photo-sensitive sheet, a light-intercepting envelope for receiving said sheet, and means for moving said holder relatively to said envelope for causing said sheet to be inserted into said envelope during the scanning process.

* * * * *

UNITED STATES PATENT OFFICE
CERTIFICATE OF CORRECTION

Patent No. 3,657,471 Dated April 18, 1972

Inventor(s) Kaoru SASABE, Yoshihiro OKINO

It is certified that error appears in the above-identified patent and that said Letters Patent are hereby corrected as shown below:

The following foreign applications should be added to the list of Foreign Application Priority Data:

| | | | |
|---|---|---|---|
| -- Japan | April 30, 1968, | No. 43/29402 | |
| Japan | May 13, 1968, | No. 43/32702 | |
| Japan | May 13, 1968, | No. 43/32703 | -- |

Signed and sealed this 8th day of May 1973.

(SEAL)
Attest:

EDWARD M.FLETCHER,JR.
Attesting Officer

ROBERT GOTTSCHALK
Commissioner of Patents